(12) United States Patent
Simonin et al.

(10) Patent No.: US 9,713,971 B1
(45) Date of Patent: Jul. 25, 2017

(54) TETHER HOOK BRACKET WITH REBOUND BLOCKER

(71) Applicant: GM GLOBAL TECHNOLOGY OPERATIONS LLC, Detroit, MI (US)

(72) Inventors: Matthew P. Simonin, Ortonville, MI (US); Charles E. Jensen, Shelby Township, MI (US); Robert N. Saje, Shelby Township, MI (US); Jonathan E. Rich, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 31 days.

(21) Appl. No.: 14/993,379

(22) Filed: Jan. 12, 2016

(51) Int. Cl.
*B60N 2/44* (2006.01)
*B60N 2/28* (2006.01)

(52) U.S. Cl.
CPC ........... *B60N 2/442* (2013.01); *B60N 2/2884* (2013.01)

(58) Field of Classification Search
CPC ..... B60N 2/442; B60N 2/2884; B60N 2/2893
USPC ........................................................ 296/68.1
See application file for complete search history.

(56) References Cited

U.S. PATENT DOCUMENTS

| | | | | |
|---|---|---|---|---|
| 6,485,055 B1* | 11/2002 | Swayne | ............... | B60N 2/2806 280/801.1 |
| 6,485,102 B1* | 11/2002 | Moffa | .................... | B60N 2/242 297/250.1 |
| 6,517,154 B2* | 2/2003 | Sawamoto | ........... | B60N 2/2809 296/68.1 |
| 6,840,560 B2* | 1/2005 | Flogard | ................ | B60N 2/4228 296/187.11 |
| 7,296,854 B2* | 11/2007 | Lentz | .................... | B60N 2/2887 296/68.1 |
| 2004/0051356 A1* | 3/2004 | Neelis | ..................... | B60N 2/289 297/253 |
| 2004/0256877 A1* | 12/2004 | Tromblee | ................ | B60R 22/18 296/68.1 |
| 2005/0057016 A1* | 3/2005 | Martinez | ........... | B60R 21/01556 280/124.152 |
| 2007/0194590 A1* | 8/2007 | Bertoli | .................... | B60N 2/286 296/68.1 |
| 2008/0136223 A1* | 6/2008 | Murphy | ............... | B60N 2/2809 297/216.11 |

\* cited by examiner

*Primary Examiner* — Pinel Romain
(74) *Attorney, Agent, or Firm* — Quinn IP Law

(57) ABSTRACT

A tether hook bracket for a vehicle subjectable to an external force event, followed by a rebound event, and having a body structure and a child seat connectable to the body structure via a tether having a tether hook includes a body structure attachment portion, a tether hook connection portion, and a tether hook rebound blocker portion. The body structure attachment portion is configured to be attachable to the body structure. The tether hook connection portion is configured to receive the tether hook, such that the tether hook is connected to the tether hook bracket. The tether hook rebound blocker portion is disposed between the body structure attachment portion and the tether hook connection portion and is configured to maintain the connection of the tether hook to the tether hook bracket when the vehicle is subjected to the rebound event.

17 Claims, 4 Drawing Sheets

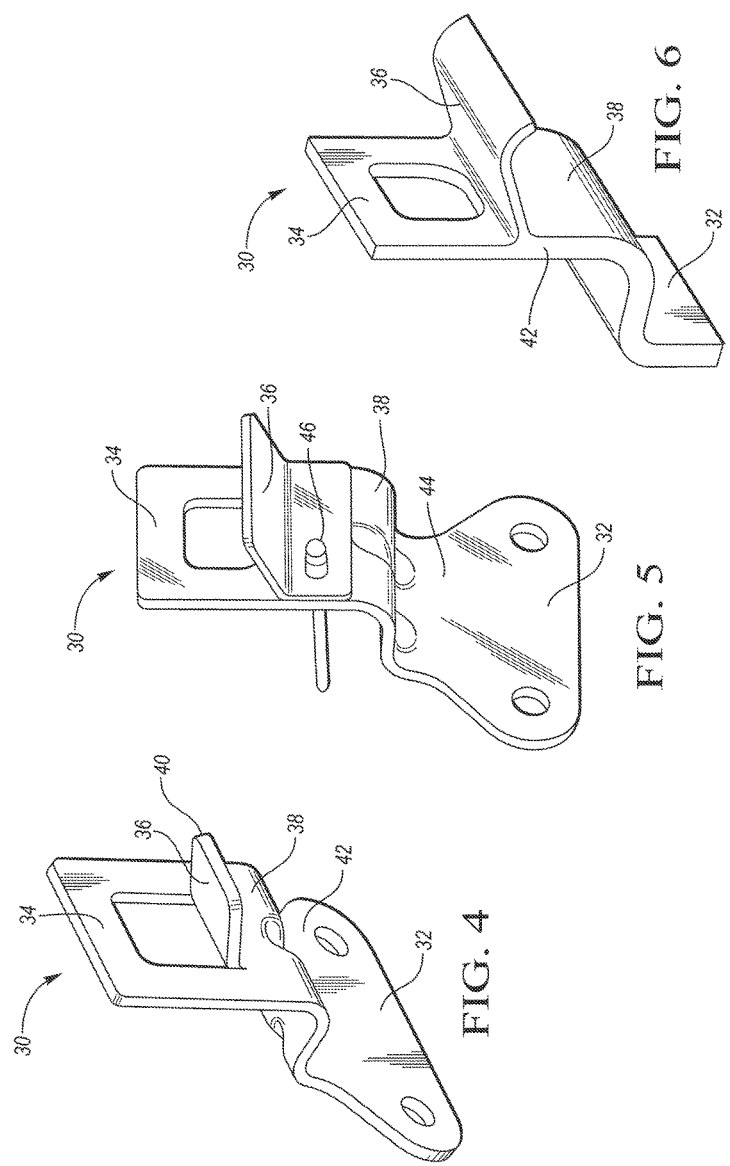

TETHER HOOK BRACKET WITH REBOUND BLOCKER

TECHNICAL FIELD

This disclosure relates to a tether hook bracket including a rebound blocker.

BACKGROUND

A vehicle may be used to transport a child seat. The child seat may be connected to the body structure of the vehicle via a tether having a tether hook. The vehicle may be subject to an external force event, followed by a rebound event.

SUMMARY

A tether hook bracket and a vehicle are provided herein. The tether hook bracket is for a vehicle subjectable to an external force event, followed by a rebound event. The vehicle includes a body structure and a child seat connectable to the body structure via a tether having a tether hook. The tether hook bracket includes a body structure attachment portion, a tether hook connection portion, and a tether hook rebound blocker portion. The body structure attachment portion is configured to be attachable to the body structure. The tether hook connection portion is configured to receive the tether hook, such that the tether hook is connected to the tether hook bracket. The tether hook rebound blocker portion is disposed between the body structure attachment portion and the tether hook connection portion and is configured to maintain the connection of the tether hook to the tether hook bracket when the vehicle is subjected to the rebound event. The tether hook bracket may further comprise a deformation portion disposed between the body structure attachment portion and the tether hook rebound blocker portion. The deformation portion may be configured to deform during the external force event.

The vehicle is subjectable to an external force event, followed by a rebound event. The vehicle includes a body structure and a child seat tether hook bracket. The child seat tether hook bracket includes a body structure attachment portion, a tether hook connection portion, and a tether hook rebound blocker portion. The body structure attachment portion is attached to the body structure. The tether hook connection portion is configured to receive a child seat tether hook, such that the child seat tether hook is connected to the child seat tether hook bracket. The tether hook rebound blocker portion is disposed between the body structure attachment portion and the tether hook connection portion and is configured to maintain the connection of the child seat tether hook to the child seat tether hook bracket when the vehicle is subjected to the rebound event. The child seat tether hook bracket may further include a deformation portion disposed between the body structure attachment portion and the tether hook rebound blocker portion. The deformation portion may be configured to deform during the external force event.

The tether hook bracket and the vehicle disclosed herein maintain the connection of the child seat tether hook to the tether hook bracket when the vehicle is subjected to an external force event, followed by a rebound event. This disclosure applies to any vehicle, including but not limited to cars, trucks, vans, busses, boats, trains, and airplanes.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 4 is a schematic, perspective illustration of a first embodiment of the tether hook bracket of FIG. 1.

FIG. 5 is a schematic, perspective illustration of a second embodiment of the tether hook bracket of FIG. 1.

FIG. 6 is a schematic, perspective illustration of a third embodiment of the tether hook bracket of FIG. 1.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
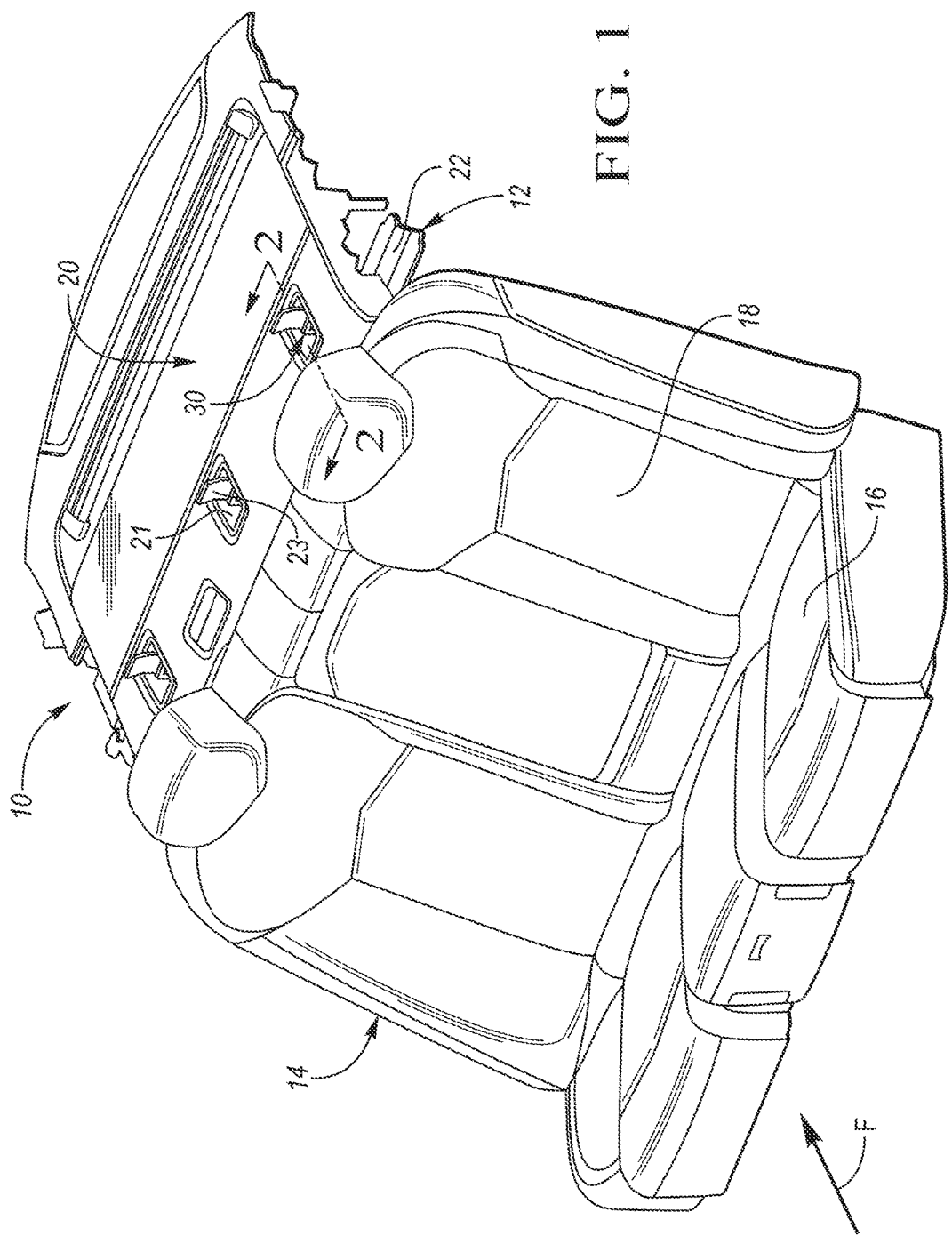
FIG. 1 is a fragmentary, schematic, perspective illustration of a vehicle having a tether hook bracket as disclosed herein.

Referring to the drawings, wherein like reference numbers refer to like components throughout the views, FIG. 1 shows a portion of an example vehicle 10. The vehicle 10 includes an example child seat tether hook bracket 30 as disclosed herein. The vehicle 10 is subjectable to an external force event (arrow F), followed by a rebound event (not shown). The external force event (arrow F) may have an external force direction (arrow F) that is toward a front end (not shown) of the vehicle 10. The external force event (arrow F) causes an external force acceleration (not shown) of the vehicle 10 and its components in the external force direction (arrow F). The rebound event occurs after the external force event (arrow F) and causes a rebound acceleration (not shown) of the vehicle 10 and its components in the external force direction (arrow F).

Figure 2:
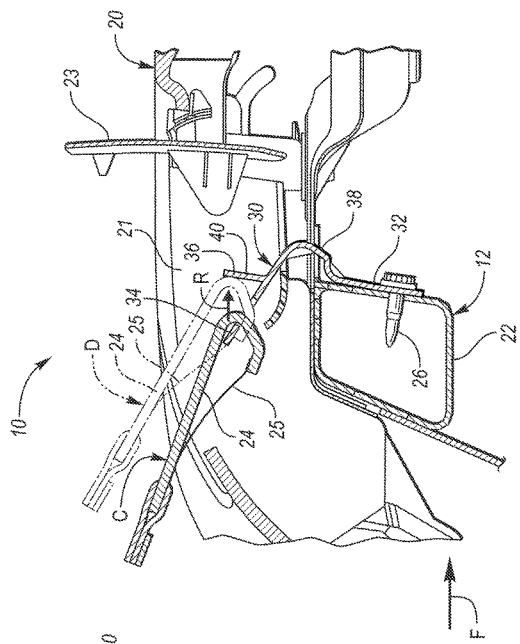
FIG. 2 is a schematic, cross-sectional illustration, partially in elevation, of the vehicle of FIG. 1, taken at line 2-2 of FIG. 1, showing a tether hook being received by the tether hook bracket and the tether hook connected to the tether hook bracket prior to an external force event.

Referring now to FIGS. 1-2, the vehicle 10 includes a body structure 12. The body structure 12 may include a seat back beam 22. The vehicle 10 includes a seat 14 attached to the body structure 12. The seat 14 may include a seat cushion 16 and a seat back 18. The seat 14 may be a rear seat, as shown, or any other seat 14 of the vehicle 10. The vehicle 10 may include a rear window trim panel 20. The rear window trim panel 20 may be configured to form a cup 21 and a cover 23. The cover 23 may have an open position, as shown, and a closed position (not shown). The cover 23 may conceal the tether hook bracket 30 when the cover 23 is in the closed position and the tether hook bracket 30 is not in use. The cover 23 may allow access to the tether hook bracket 30 when the cover 23 is in the open position and the tether hook bracket 30 is in use. The cup 21 may provide an aesthetic trim for an area surrounding the tether hook bracket 30 when the cover 23 is in the open position.

Figure 3:
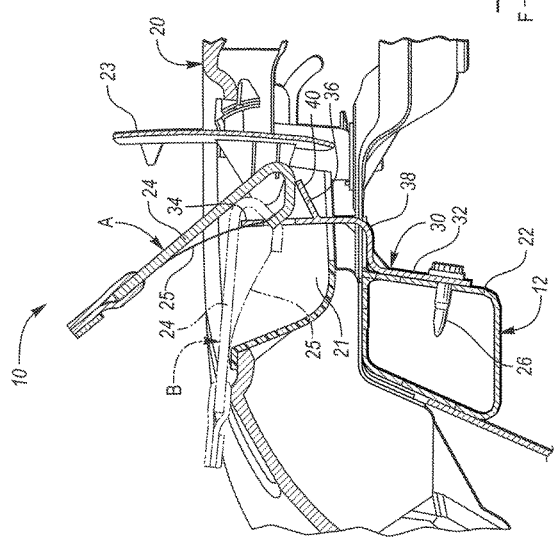
FIG. 3 is a schematic, cross-sectional illustration, partially in elevation, of the vehicle of FIG. 1, taken at line 2-2 of FIG. 1, showing the tether hook and the tether hook bracket during the external force event and during a rebound event.

A child seat (not shown) may be disposed on the seat cushion 16 and the seat back 18 of the seat 14 and connected to the body structure 12 of the vehicle 10 via a tether (not shown) having a tether hook 24, as best seen in FIGS. 2-3. The child seat tether hook 24 may include a spring clip 25 configured to maintain the connection of the child seat tether hook 24 to the child seat tether hook bracket 30. The child seat tether hook bracket 30 may be an upper child seat tether hook bracket, as shown, a lower child seat tether hook bracket (not shown), or any other child seat tether hook bracket. The child seat tether hook 24 may be a corresponding upper child seat tether hook, as shown, a corresponding lower child seat tether hook, or any other child seat tether hook of the child seat.

Referring now to FIG. 2, the child seat tether hook bracket 30 includes a body structure attachment portion 32, a tether hook connection portion 34, and a tether hook rebound blocker portion 36. The body structure attachment portion 32 is attached to the body structure 12. The body structure attachment portion 32 may be attached to the seat back beam 22 of the body structure 12, as shown. Alternatively, the body structure attachment portion 32 may be attached to any other suitable part of the body structure 12 or to a seat structure (not shown) of the seat 14, which is in turn attached to the body structure 12. The body structure attachment portion 32 may be attached to the body structure 12 via a mechanical fastener 26, a weld (not shown), or any other suitable attachment.

The tether hook connection portion 34 is configured to receive the tether hook 24, when the tether hook 24 is in a first or connection position A, such that the tether hook 24 is connected to the tether hook bracket 30. After the tether hook 24 is connected to the tether hook bracket 30, the tether may be tightened and the tether hook 24 may move to a second or tightened position B.

Referring now to FIGS. 2-3, the tether hook bracket 30 may further include a deformation portion 38 disposed between the body structure attachment portion 32 and the rebound blocker portion 36. The deformation portion 38 may be configured to deform, as shown in FIG. 3, when the vehicle 10 is subjected to the external force event (arrow F). The external force event (arrow F) and the resulting deformation of the deformation portion 38 of the child seat tether hook bracket 30 may move the child seat tether hook to a third or external force position C, as shown in FIG. 3.

After the external force event (arrow F), the rebound event may cause the tether hook 24 to move rearward relative to the tether hook bracket 30. The tether hook rebound blocker portion 36 is disposed between the body structure attachment portion 32 and the tether hook connection portion 34 and is configured to maintain the connection of the tether hook 24 to the tether hook bracket 30 when the vehicle 10 is subjected to the rebound event. The tether hook 24 may move to a fourth or rebound position D, as shown in FIG. 3. The tether hook rebound blocker portion 36 may block a rearward movement (arrow R) of the tether hook 24 during the rebound event, thus keeping the tether hook 24 connected to the tether hook bracket 30 during the rebound event. The tether hook rebound blocker portion 36 may prevent detachment of a tether hook 24 that has been damaged from the tether hook connection portion 34 of the tether hook bracket 30 when the vehicle 10 is subjected to the rebound event. For example, if the tether hook 24 had a damaged or missing spring clip 25, the tether hook rebound blocker portion 36 may prevent the tether hook 24 from disconnecting with the tether hook connection portion 34 of the tether hook bracket 30 when the vehicle 10 is subjected to the rebound event.

The tether hook rebound blocker portion 36 of the tether hook bracket 30 may be a tab 40 configured to extend toward a rear end (not shown) of the vehicle 10, i.e., rearward, prior to the external force event (arrow F). The tab 40 may be disposed below the tether hook connection portion 34 prior to the external force event (arrow F) such that the tether hook connection portion 34 can receive the tether hook 24 without interference or contact between the tether hook 24 and the tab 40. The tab 40 may be disposed rearward of the tether hook connection portion 34 after the external force event (arrow F) such that a rearward movement (arrow R) of the tether hook 24 during the rebound event is blocked or prevented by the tab 40 and the connection of the tether hook 24 to the tether hook bracket 30 is maintained.

The spring clip 25 of the child seat tether hook 24 may not function to maintain the connection of the child seat tether hook 24 to the child seat tether hook bracket 30 after the external force event (arrow F). The tether hook rebound blocker portion 36 of the tether hook bracket 30 may be further configured to maintain the connection of the child seat tether hook 24 to the child seat tether hook bracket 30 when the vehicle 10 is subjected to the rebound event and the spring clip 25 of the child seat tether hook 24 does not function.

Referring now to FIGS. 4 and 6, the body structure attachment portion 32, the deformation portion 38, the tether hook rebound blocker portion 36, and the tether hook connection portion 34 of the child seat tether hook bracket 30 may be formed together as a single piece 42. FIG. 4 shows the single piece 42 formed as a stamping. FIG. 6 shows the single piece formed as an extrusion. Any other suitable process or method may be used to form the single piece 42.

Figure 7:
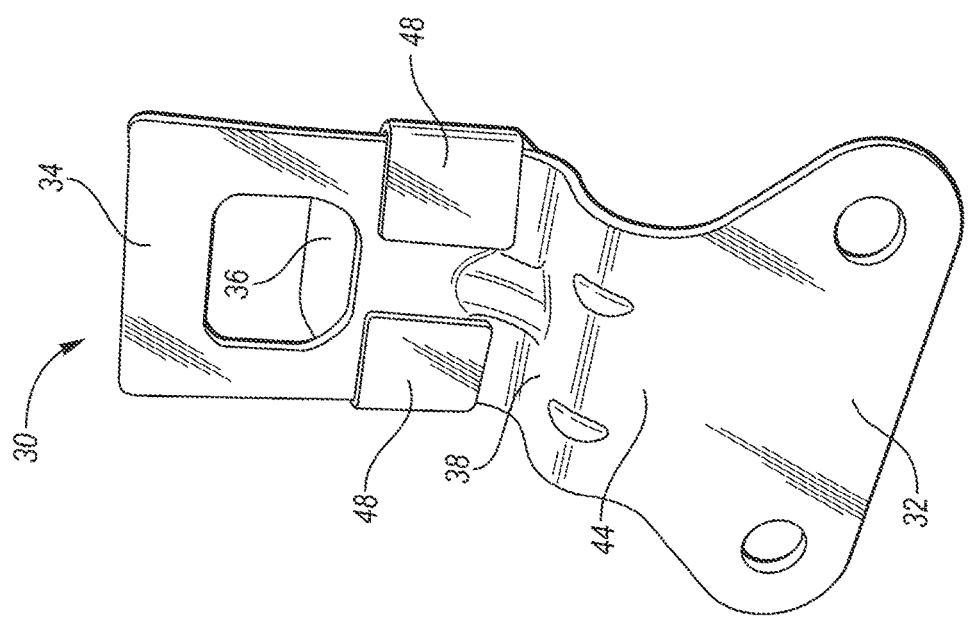
FIG. 7 is a schematic, perspective illustration of a fourth embodiment of the tether hook bracket of FIG. 1.
Figure 8:
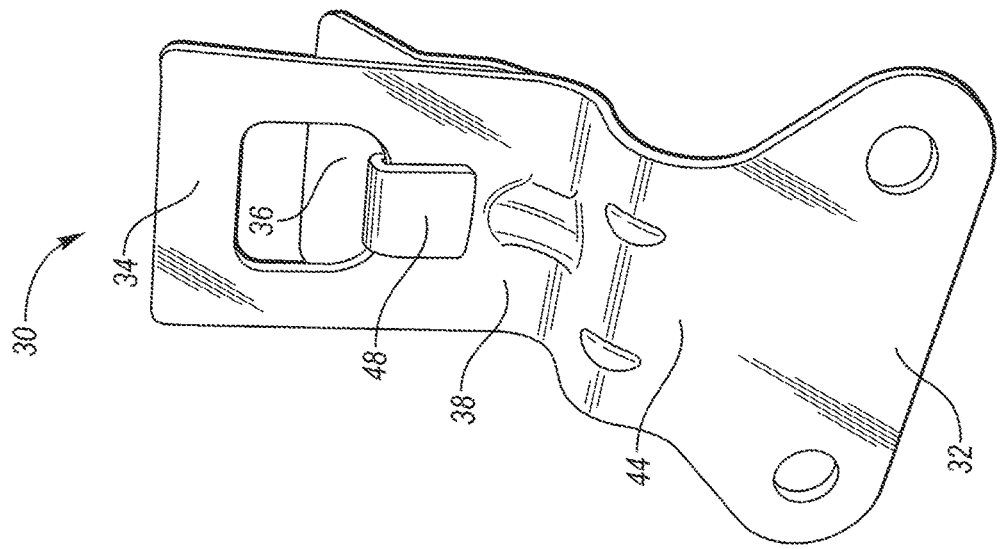
FIG. 8 is a schematic, perspective illustration of a fifth embodiment of the tether hook bracket of FIG. 1.

Referring now to FIGS. 5, 7, and 8, the body structure attachment portion 32, the deformation portion 38, and the tether hook connection portion 36 of the child seat tether hook bracket 30 may be formed together as a single first piece 44. The single first piece 44 may be formed by stamping, as shown, by extrusion or by any other suitable method. The tether hook rebound blocker portion 36 of the child seat tether hook bracket 30 may be attached to the first piece 44 of the child seat tether hook bracket 30. FIG. 5 shows the tether hook rebound blocker portion 36 attached to the first piece 44 via a second mechanical fastener 46.

FIGS. 7 and 8 show the tether hook rebound blocker portion 36 attached to the first piece 44 via a slide-on clip 48 formed on the tether hook rebound blocker portion 36. A first embodiment of the slide-on clip 48 is shown in FIG. 7. A second embodiment of the slide-on clip 48 is shown in FIG. 8. The embodiments shown in FIGS. 7 and 8 may allow addition of the tether hook rebound blocker portion 36 to an existing child tether hook bracket that does not include a tether hook rebound blocker portion 36 without the complexities and tool access requirements of welding or mechanical fastening. Alternatively, attachment of the tether hook rebound blocker portion 36 to the first piece 44 may be via a weld, a crimp, or any other suitable attachment.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A tether hook bracket for a vehicle subjectable to an external force event, followed by a rebound event, and including a body structure and a child seat connectable to the body structure via a tether having a tether hook, the tether hook bracket comprising:
   a body structure attachment portion configured to be attachable to the body structure;
   a tether hook connection portion configured to receive the tether hook, such that the tether hook is connected to the tether hook bracket; and
   a tether hook rebound blocker portion disposed between the body structure attachment portion and the tether hook connection portion and configured to maintain the connection of the tether hook to the tether hook bracket when the vehicle is subjected to the rebound event.

2. The tether hook bracket of claim 1, further comprising a deformation portion disposed between the body structure attachment portion and the tether hook rebound blocker portion and configured to deform during the external force event.

3. The tether hook bracket of claim 2, wherein the tether hook rebound blocker portion is a tab configured to extend rearward prior to the external force event;
   wherein the tab is disposed below the tether hook connection portion prior to the external force event such that the tether hook connection portion can receive the tether hook without interference from the tab; and
   wherein the tab is disposed rearward of the tether hook connection portion after the external force event such that a rearward movement of the tether hook during the rebound event is blocked by the tab and the connection of the tether hook to the tether hook bracket is maintained.

4. The tether hook bracket of claim 3, wherein the body structure attachment portion, the deformation portion, the tether hook rebound blocker portion, and the tether hook connection portion of the tether hook bracket are formed together as a single piece.

5. The tether hook bracket of claim 3, wherein the body structure attachment portion, the deformation portion, and the tether hook connection portion of the tether hook bracket are formed together as a first piece of the tether hook bracket; and
   wherein the tether hook rebound blocker portion of the tether hook bracket is attached to the first piece of the tether hook bracket.

6. The tether hook bracket of claim 5, wherein the tether hook rebound blocker portion of the tether hook bracket is attached to the first piece of the tether hook bracket via a slide-on clip.

7. The tether hook bracket of claim 1, wherein the tether hook includes a spring clip configured to maintain the connection of the tether hook to the tether hook bracket; and
   wherein the tether hook rebound blocker portion is further configured to maintain the connection of the tether hook to the tether hook bracket when the vehicle is subjected to the rebound event and the spring clip of the child seat tether hook does not function.

8. A vehicle subjectable to an external force event, followed by a rebound event, comprising:
   a body structure; and
   a child seat tether hook bracket, including:
      a body structure attachment portion attached to the body structure;
      a tether hook connection portion configured to receive a child seat tether hook, such that the child seat tether hook is connected to the child seat tether hook bracket; and
      a tether hook rebound blocker portion disposed between the body structure attachment portion and the tether hook connection portion and configured to maintain the connection of the child seat tether hook to the child seat tether hook bracket when the vehicle is subjected to the rebound event.

9. The vehicle of claim 8, wherein the child seat tether hook bracket further includes a deformation portion disposed between the body structure attachment portion and the tether hook rebound blocker portion and configured to deform during the external force event.

10. The vehicle of claim 9, wherein the external force event has an external force direction that is toward a front end of the vehicle:
    wherein the tether hook rebound blocker portion is a tab configured to extend toward a rear end of the vehicle prior to the external force event;
    wherein the tab is disposed below the tether hook connection portion prior to the external force event such that the tether hook connection portion can receive the tether hook without interference from the tab; and
    wherein the tab is disposed rearward of the tether hook connection portion after the external force event such that a rearward movement of the tether hook during the rebound event is blocked by the tab and the connection of the tether hook to the tether hook bracket is maintained.

11. The vehicle of claim 10, wherein the body structure attachment portion, the deformation portion, the tether hook rebound blocker portion, and the tether hook connection portion of the child seat tether hook bracket are formed together as a single piece.

12. The vehicle of claim 10, wherein the body structure attachment portion, the deformation portion, and the tether hook connection portion of the child seat tether hook bracket are formed together as a first piece; and
    wherein the tether hook rebound blocker portion of the child seat tether hook bracket is attached to the first piece of the child seat tether hook bracket.

13. The vehicle of claim 12, wherein the tether hook rebound blocker portion of the child tether hook bracket is attached to the first piece of the child tether hook bracket via a slide-on clip.

14. The vehicle of claim 8, wherein the body structure includes a seat back beam; and
    wherein the body structure attachment portion of the child seat tether hook bracket is attached to the seat back beam of the body structure.

15. The vehicle of claim 8, wherein the body structure attachment portion of the child seat tether hook bracket is attached to the body structure via a weld.

16. The vehicle of claim 8, wherein the body structure attachment portion of the child seat tether hook bracket is attached to the body structure via a mechanical fastener.

17. The vehicle of claim 8, wherein the child seat tether hook includes a spring clip configured to maintain the connection of the child seat tether hook to the child seat tether hook bracket; and
    wherein the tether hook rebound blocker portion is further configured to maintain the connection of the child seat tether hook to the child seat tether hook bracket when the vehicle is subjected to the rebound event and the spring clip of the child seat tether hook does not function.

\* \* \* \* \*